455-503 AU 233 EX
FIP8106 OR 3,325,593

INVENTORS
RAYMOND V. PLATT
DOMINGO M. DELGADO
BY
Jacob L. Kollin
ATTORNEY

INVENTORS
RAYMOND V. PLATT
DOMINGO M. DELGADO
BY
Jacob L. Kollin
ATTORNEY

INVENTORS
RAYMOND V. PLATT
DOMINGO M. DELGADO
BY
Jacob L. Kollin
ATTORNEY

United States Patent Office 3,325,593

Patented June 13, 1967

3,325,593

LIGHT ACTUATED PORTABLE REMOTE TV CONTROL DEVICE

Raymond V. Platt and Domingo M. Delgado, Brooklyn, N.Y., assignors to Raymond V. Platt and Domingo Delgado, both of Brooklyn, N.Y., equally Filed Jan. 4, 1965, Ser. No. 423,020
10 Claims. (Cl. 178—6)

Our present invention relates to remote control devices for wave-signal receivers in general and particularly to a portable, detachable, remote television receiver control device adapted for use with most television receivers of various makes now in use.

An important object of the invention is to provide a device of the character described which will make it possibe to turn on and off a television receiver and change the channels thereof from a distance.

Another important object of the invention is to provide such a device to be attached to or detached from a given television receiver, whereby upon detaching it may be attached to any other television receiver.

Yet another object of the invention is to provide such a device which is portable and does not require installation in the chassis of a television receiver.

Still another object of the invention is to provide a device of the character described which may be secured to an existing tuner shaft by the simple removal of the tuner shaft knob and may be mounted in any desired position.

A further object of the invention is to provide such a device which is operable on ordinary house current and wherein the sending control means is actuated by a dry cell or a plurality of these.

Another object of the invention is to provide such a device which will not interfere with the television receiver's reception while in use.

Still another object of the invention is to provide such a control device which may be secured exteriorly of a television receiver, without requiring any circuit changes or alterations in said receiver.

Yet another object of the invention is to provide such a device which will tune a desired channel with precision.

A further object of the invention is to provide such a device which will obviate manual tuning or switching on and off of a television receiver, while permitting manual control if desired.

Another object of the invention is to provide a portable remote control device the sending control unit whereof requires no wiring connection to the receiving unit of said control device.

Another object of the invention is to provide such a device which can be operated by any person without requiring special skill.

Yet another object of the invention is to provide such a device which is compact, light and simple in construction and which may be manufactured at a reasonable cost, thus making it readily available to television viewers.

These and other important objects of the invention will become apparent from the following description and the accompanying drawing wherein like numerals refer to like parts throughout.

Figure 1:
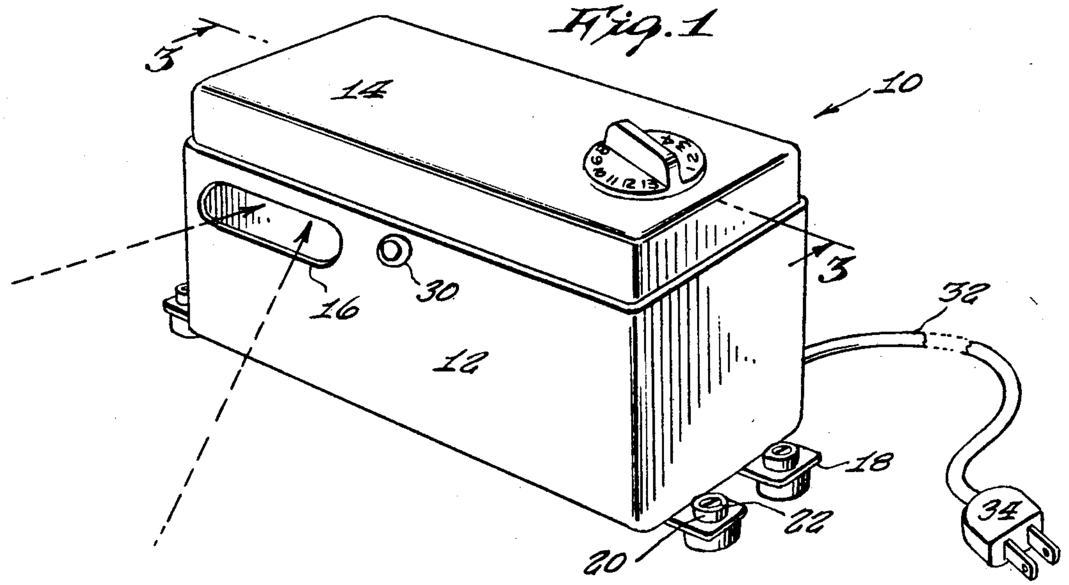
FIG. 1 is a perspective view of the receiving unit of the device according to the invention.
Figure 2:
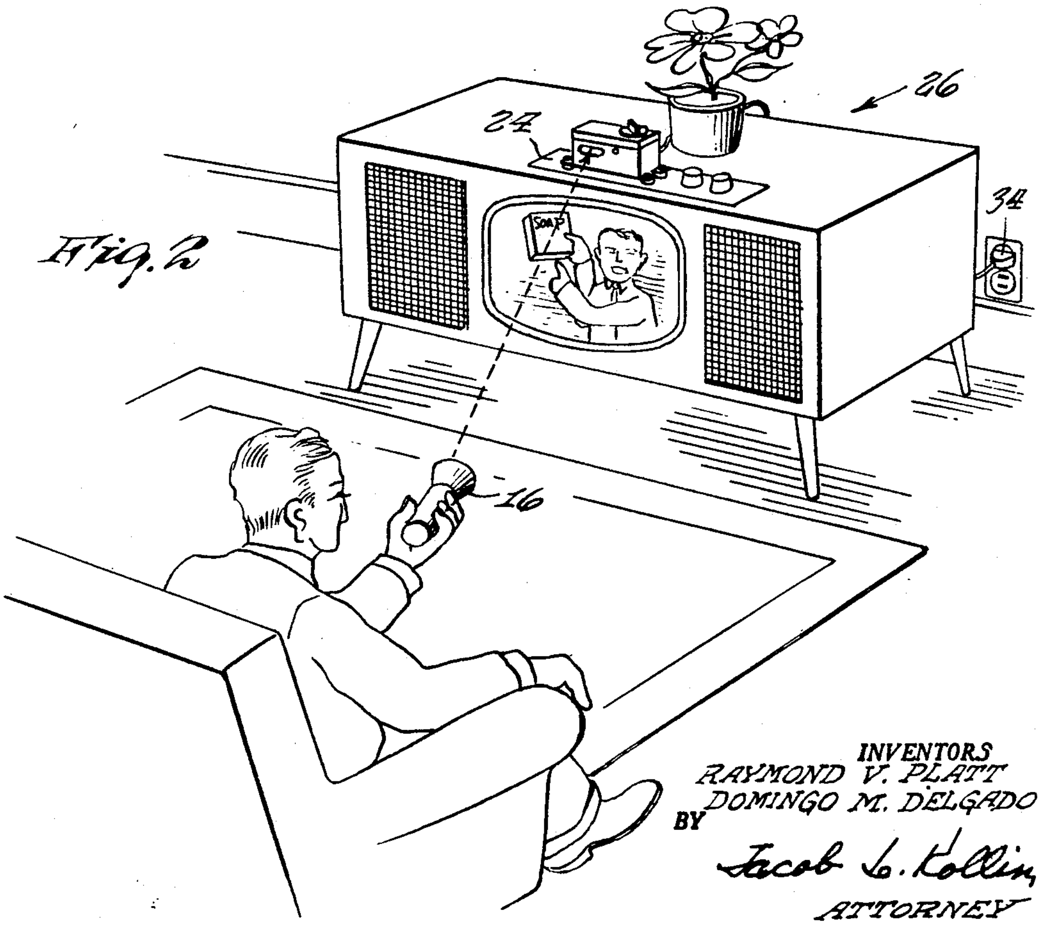
FIG. 2 illustrates the manner of operation of the device in conjunction with a television receiver.

Referring now to the drawing in detail, the receiving unit of the device, generally indicated by the numeral 10 comprises a housing 12 provided with a cover 14, an elongated opening to permit the passage of light rays from a flashlight 16 into the interior of the unit 10. The unit is further provided with brackets 18 and encrusted rubber grommets 20 for securing the unit by means of screws 22 to the panel 24 of a television receiver 26.

Extending outwardly of the housing 12 is a tuning knob 28, which may be employed for manual tuning of the receiver, if desired. There is further provided a pilot light 30, which is lighted when the receiving unit is connected to a current source through cord 32 and plug 34.

Secured to an interior partition 36 of the housing 12 is a photoelectric cadmium sulphide cell 38 whose one terminal is connected in series through wire 40, a 750 milliampere diode 42 and a 720 ohm-1 watt resistor 44 to the leg 46 of an alternating current conductor at 48. The other terminal of the photoelectric cell is connected through the winding of a relay 50 and wires 52, **52*a* to the other leg of the alternating current conductor at 54. An 8 mf., 150 volt electrolytic condenser 56 is connected across the wires 40 and 52*a*, while another 16 mf., 150 volt condenser 58 is connected between the wires 52 and 52*a*. One terminal of an A.C. motor 60 is connected through wire 62 to one side of an A.C. source, while the motor's other terminal may be connected to the wire 46 on the A.C. source through the intermediary of relay contacts 64, 66 or microswitches 68, 70 when switch 72 is closed. The .25 watt neon pilot light 30 is connected in parallel with a socket 74 and is connected to wire 46*a* and, through a 120K, .25 watt resistor and microswitch 76 to wire 62**.

Figures 3, 4:
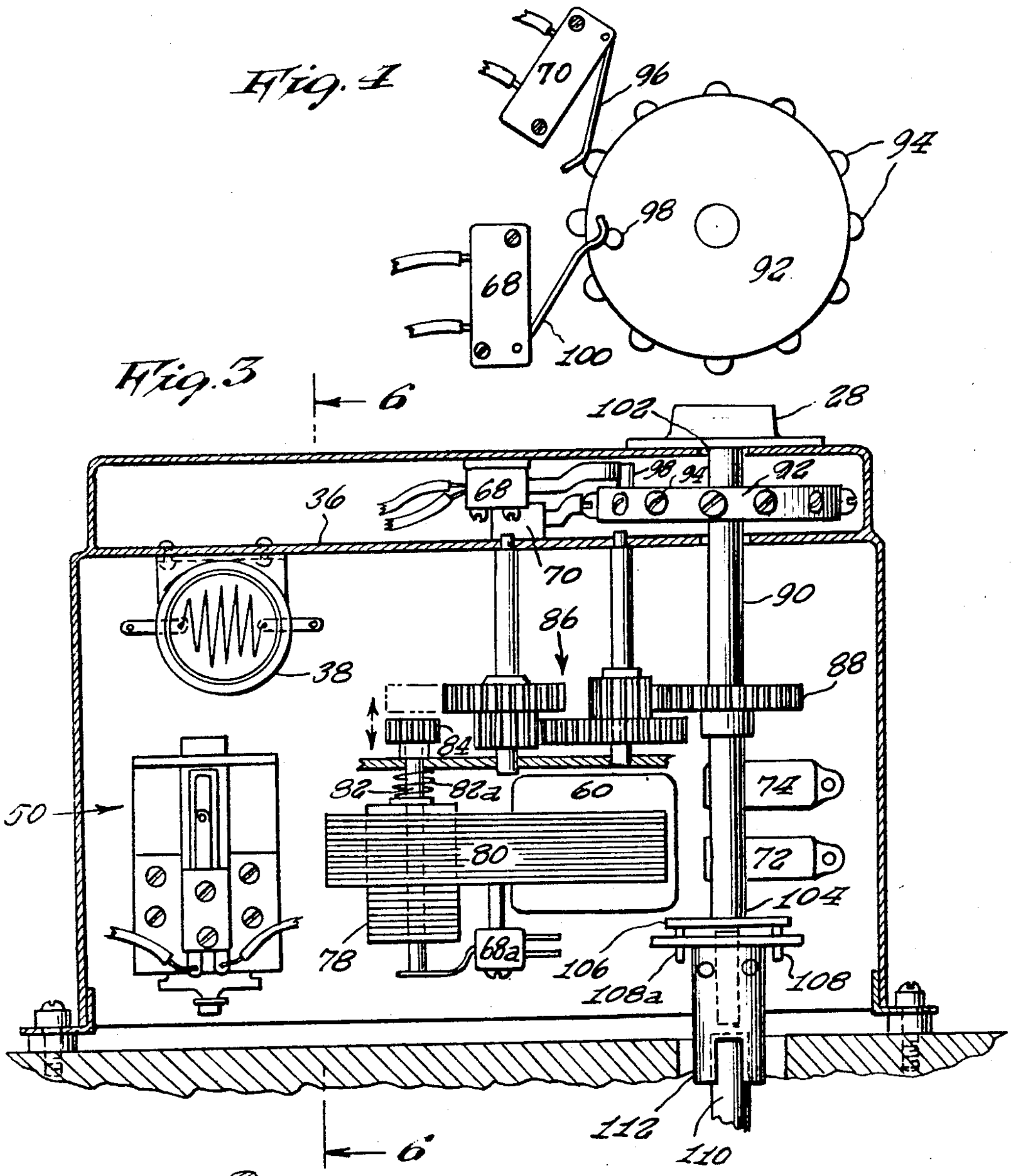
FIG. 3 is a plan view, partly in section, of the receiving unit, taken on line 3—3 of FIG. 1.
FIG. 4 is a detail of the switching arrangement.
Figure 5:
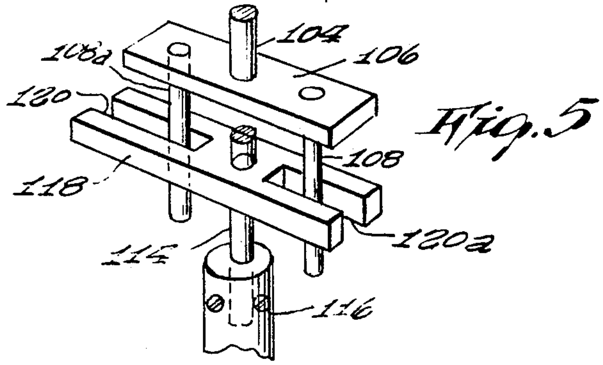
FIG. 5 is an enlarged detail of the means for coupling the receiving unit with a tuner shaft.
Figure 6:
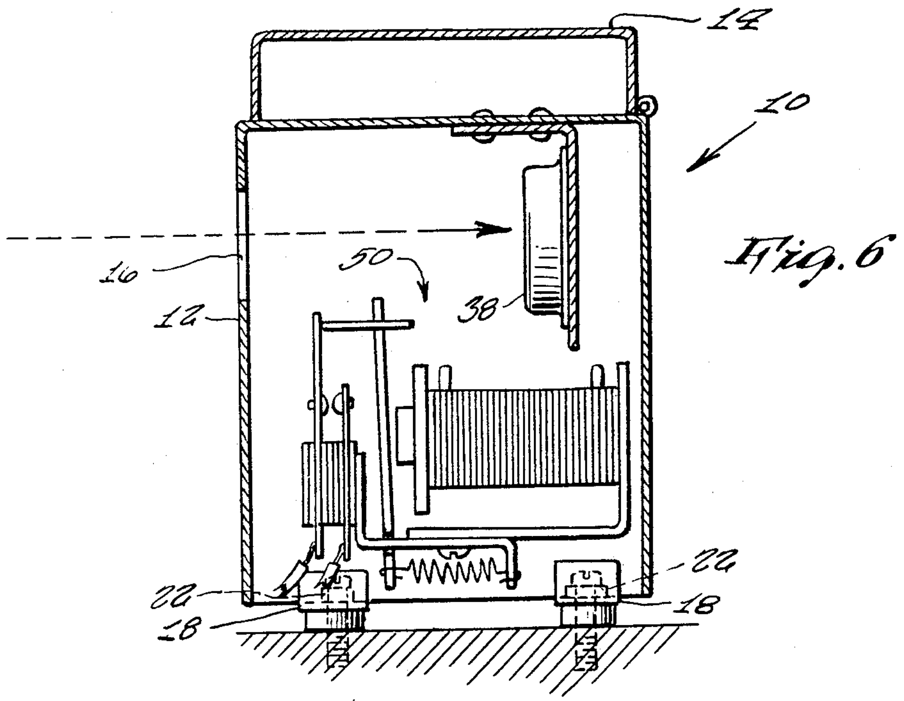
FIG. 6 is a view, partly in section, taken on line 6—6 of FIG. 3.
Figure 7:
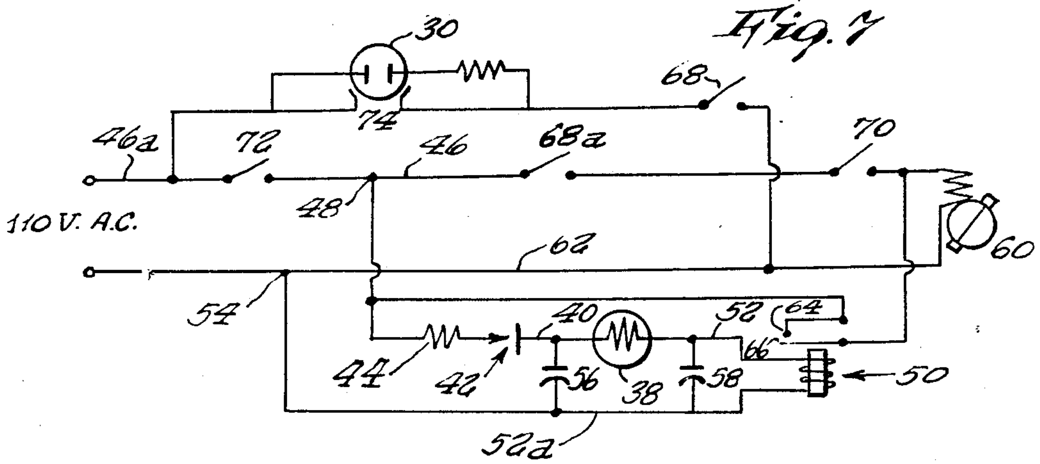
FIG. 7 is a diagrammatic representation of the circuit of the device.

As may be seen in FIG. 3, the motor 60 is provided with a displaceable armature 78 which is displaceable in the core 80 of the motor and which has a shaft 82 provided with a pinion 84 capable of engaging through a reduction gear train generally indicated as 86, the driven gear 88, rigidly secured to the shaft 90. Mounted on the shaft 90 is a disc 92 provided with a plurality of round screw heads 94 corresponding to the usual number of channels of a television receiver, so that during the disc's rotation the screw heads 94 displace sequentially the arm 96 of microswitch 70. Extending laterally of the disc 92 is a pin 98 which can actuate the arm 100 of the microswitch 68.

The end 102 of the shaft 90 carries the rigidly secured knob 28 for manual tuning while the other end of said shaft, 104 is provided with a plate 106 bearing a pair of spaced pins 108, **108*a***.

For coupling shaft end 110 of a television receiver to the control unit, after the receiver's tuning knob (not shown) has been removed, there is provided a sleeve 112 which is adjustable on rod 114 by means of set screws 116. The rod 114 is integrally secured to a plate 118, provided with solts **120*a* in which engage the pins 108, 108*a***.

The portable remote television control device is used in the following manner.

The channel selector knob of the television receiver 26 is removed and the receiving unit is secured to panel 24 of the receiver by screws 22 in such a manner that adjustable sleeve 112 will engage the shaft 110 of the receiver. The adjustment may be effected by sliding in either direction and securing it by means of the set screws 116. The receiver's plug is inserted into the receptacle 74 of the unit, while plug 34 of the latter is connected to an A.C. supply source. The viewer seated at an appropriate distance in front of the television receiver flashes the light from a flashlight 16 at the photoelectric cell 38 through slot 16 of the receiving unit. This may be done from any convenient angle down to about 45°. The photocell's resistance is thereby reduced, permitting current to pass through the relay 50 thereby closing contacts 64, 66 so that A.C. current will flow through motor 60, which will displace the armature 78 into the position shown by dotted lines in FIG. 3, and cause it to rotate thereby engaging pinion 84 with gear train 86 and through the latter gear 88 of shaft 90 with its disc 92. As the disc 92 is rotated, its screw heads 94 will displace the arms 96 and 100 of the microswitches 70 and 68 thus closing the circuit of the television receiver which is connected (not shown) through the receptacle 5 to the A.C. current supply. As the motor continues its rotation the next one of the screw heads 94 will displace the lever 96, thus opening contacts 70 and opening the circuit of motor 60.

The motor will thus come to a stop, the armature 78 will return into its original position, thus opening the contacts of switch 68a. The television receiver will now be functioning in the channel corresponding to the screw head last contact by the lever 96.

To change the channel another ray of light is projected at the photoelectric cell 38 thus repeating the above described cycle of operation until the desired channel is reached, when the flashlight need only be turned off.

To turn the television receiver off, the light rays from the flashlight are directed at the photocell 38 and the disc 92 is placed in operation until the tripper rod 98 will displace the lever 100 of microswitch 68, thus opening the circuit of the plug and socket connection 74 to the television receiver.

The television receiver may be operated manually if desired. In that case, since the microswitch 68 is open and in series with microswitch 70, the motor 80 will not function, although the disc is being rotated by means of knob 28.

Figure 8:
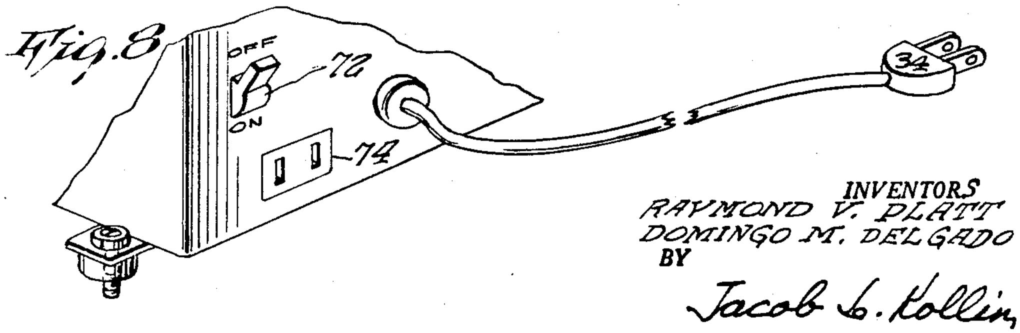
FIG. 8 illustrates the connection and switch means in the receiving unit.

If only remains to note that the toggle switch 72, shown in FIG. 8 is provided to disconnect the receiving unit of the control device and thus the television receiver from tampering by children, for example, who may playfully direct a flashlight at the photocell of the device.

While a particular embodiment of the present invention has been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

Having thus disclosed our invention, what we claim and desire to secure by Letters Patent of the United States of America is:

1. Portable remote television receiver control, comprising a housing, a shaft rotatably mounted in said housing, means for detachably securing one end of said shaft to a tuner shaft of a television receiver, a switch disc axially secured adjacent the other end of said shaft, said disc having peripherally mounted spaced projections corresponding in number to channels of a television receiver and a laterally extending switch pin, a first microswitch actuable by said projections, an alternating current motor operatively connected with said shaft and said disc, said motor being connected to a first alternating current circuit in series with said first microswitch, said projections being adopted to open said switch, an armature displaceable transversely to the magnetic field poles of said motor, means normally biasing said armature outwardly of said motor's field, a second microswitch connected in series in said circuit and maintained in closed position by said armature when said armature is in its outward position, a photocell, a second direct current circuit connected to said alternating current circuit forwardly of said microswitches, rectifier means in said direct current circuit for rectifying the latter, a relay in said direct current circuit for actuating said motor in said first alternating current circuit, a photocell connected in series with said relay, and mounted in said housing, said photocell being adapted to close said direct circuit when impinged upon by light rays, said housing having an opening for the passage of light rays and a third microswitch connected in series in said first alternating current circuit and actuable by said laterally extending switch pin for opening and closing said circuit upon rotation of said disc.

2. The device according to claim 1, wherein said means for detachably securing said one end of the shaft to a tuner shaft of a television receiver comprises a first plate transversely secured to said one end of the shaft, a pair of spaced pins rigidly secured to said first plate and extending outwardly of and parallel to said shaft, a second plate having end slots for receiving said pins, a central shaft secured to said second plate, a sleeve adjustable longitudinally of said shaft, said sleeve being adapted to engage with a tuner shaft of a television receiver, and set screw means in said sleeve for securing said sleeve on said central shaft in a desired position.

3. The device according to claim 1, wherein said one end of the shaft extends outwardly of said housing and a control knob mounted on said one end for manually actuating said shaft.

4. The device according to claim 1, wherein said photocell is of the cadmium sulphide type.

5. The device according to claim 1, wherein said armature is provided with a pinion, said shaft having a gear mounted thereon and a reduction gear train engageable with said pinion and said gear on said shaft.

6. The device according to claim 1, wherein said means for biasing the armature is a coil spring.

7. The device according to claim 1, further provided with a pilot light mounted outwardly of said housing said pilot light being connected in series with said third microswitch in said alternating current circuit.

8. The device according to claim 1, further provided with a fourth manual switch in said alternating current circuit for connecting and disconnecting the latter to an alternating current source.

9. The device according to claim 1, further provided with electrical connecting means in said housing for connecting a television receiver said electrical connecting means being connected in parallel to said alternating current circuit.

10. The device according to claim 1, wherein said housing is provided with bracket means for securing said device to a desired television receiver.

References Cited

UNITED STATES PATENTS 3,294,901 12/1966 Stangli ............... 178—6

JOHN W. CALDWELL, *Acting Primary Examiner.*

R. L. RICHARDSON, *Assistant Examiner.*